United States Patent Office.

DEMETRY MINDELEFF, OF WASHINGTON, DISTRICT OF COLUMBIA.

*Letters Patent No. 82,260, dated September 15, 1868.*

IMPROVEMENT IN THE MANUFACTURE OF ARTIFICIAL STONE.

*The Schedule referred to in these Letters Patent and making part of the same.*

TO ALL WHOM IT MAY CONCERN:

Be it known that I, DEMETRY MINDELEFF, of Washington, in the county of Washington, and District of Columbia, have invented a new and useful Improvement in Artificial Stone; and I do hereby declare the following to be a full, clear, and exact description of the same, reference being had to the accompanying drawings, in which, for convenience, I describe my improvement as referring to the artificial stone made according to Ransome's process, and known as Ransome's artificial stone, though my improvement may be employed with equal advantage in connection with any other process for producing an artificial stone.

My improvement consists in the deposition of metal in the substance of which the artificial stone is formed, which may be effected by electricity, or other equivalent means, the effects produced being a greatly-increased compactness of the substance at the surface of the stone, and imperviousness to aqueous or atmospheric agencies.

That others may fully understand my invention, I will particularly describe it.

As is well known, artificial stones are moulded in the desired forms while in a plastic state, and become hardened by chemical changes resulting from the combination of materials used, or by after treatment.

My improvement requires that a portion of metal should be mixed with the plastic material of which the stone is to be composed. For this purpose, I deem it preferable to employ an alloy of iron and zinc, which may be reduced to a fine powder. A portion of graphite may also be added, but this, though advantageous, may be dispensed with.

The proportions of metal to other ingredients do not require to be according to any exact standard, but may be, say, one pound of metallic powder to one bushel of sand, though even considerable variations from these proportions will not produce any material variation in the results attained.

It is only necessary that this metallic mixture should be present at those points of the surface which, when the stone is built into the structure, will be exposed to the atmosphere, and in manipulating the materials, the metallic mixture may be placed first in the mould, forming a lining of limited thickness to those parts of the mould which shape the surface to be exposed.

The process of mixing the materials and moulding them is, with the exception above stated, the same as ordinarily practised, until the block has been removed from the mould, when it is placed in a solution of some metallic salt, as, of iron, copper, zinc, lead, tin, &c., and, by means of electricity, the metal is extracted from the solution, and deposited in the substance of the stone, over such portions of its surface as contain the metallic ingredients first described.

By this improvement, the minute interstices between the solid particles are filled with metal, and the water, or substance capable of absorbing water, which is always present in these interstices in artificial stones, is expelled, and the surface rendered thereafter impervious to aqueous and atmospheric influences.

It is not necessary that I should describe the methods of producing the electric current, as they are well known, and the apparatus for generating said current may be chosen with reference to special circumstances of the situation. They may be either mechanical or chemical, but I prefer to use magneto-electricity, as being more uniform in its action, and more economical.

Having described my improvement, what I claim as new, is—

The herein-described improvement in artificial stone.

DEMETRY MINDELEFF.

Witnesses:
   R. D. O. SMITH,
   R. S. TURNER.